United States Patent
Pay et al.

(10) Patent No.: US 10,640,058 B2
(45) Date of Patent: May 5, 2020

(54) SUPPORT FOR BUNDLE OVERLENGTHS IN AN ELECTRICAL AND/OR OPTICAL HARNESS, VEHICLE COMPRISING SUCH A SUPPORT AND METHOD FOR INSTALLING BUNDLES BY IMPLEMENTING SUCH A SUPPORT

(71) Applicant: STELIA AEROSPACE, Rochefort (FR)

(72) Inventors: Jonathan Pay, Lagord (FR); Antony Paoly, Verines (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 16/506,031

(22) Filed: Jul. 9, 2019

(65) Prior Publication Data

US 2020/0017038 A1   Jan. 16, 2020

(30) Foreign Application Priority Data

Jul. 10, 2018 (FR) ...................... 18 56339

(51) Int. Cl.
*B60R 16/02* (2006.01)
*H02G 3/04* (2006.01)

(52) U.S. Cl.
CPC ....... *B60R 16/0215* (2013.01); *H02G 3/0487* (2013.01)

(58) Field of Classification Search
CPC .......................... H02G 3/0487; B60R 16/0215
USPC ....................................................... 174/72 A
See application file for complete search history.

(56) References Cited

U.S. PATENT DOCUMENTS

| | | | | |
|---|---|---|---|---|
| 3,320,842 A * | 5/1967 | Bailey | .................. | G03D 15/046 83/61 |
| 5,556,059 A * | 9/1996 | Maeda | ................ | B60R 16/0215 174/69 |
| 6,483,033 B1 * | 11/2002 | Simoes | ................ | G02B 6/4457 174/135 |

(Continued)

FOREIGN PATENT DOCUMENTS

| | | |
|---|---|---|
| JP | 58120155 | 8/1983 |
| JP | 2002022971 | 1/2002 |
| WO | 2007112477 | 10/2007 |

OTHER PUBLICATIONS

Preliminary Search Report for French Application No. 1856339 dated Mar. 8, 2019.

*Primary Examiner* — Stanley Tso
(74) *Attorney, Agent, or Firm* — Perman & Green, LLP

(57) ABSTRACT

A support for overlengths of cable bundles, includes a rear wall by which the support is fixed, an almost-toroidal cavity, at least one axial indentation, and a cover. The almost-toroidal cavity is delimited by: the rear wall; an inner wall determining a small diameter of the almost-toroidal cavity; and an outer wall determining a large diameter, greater than the small diameter, of the almost-toroidal cavity. The cover is fixed removably such that: the almost-toroidal cavity is open, on the front side of the support, over a whole length of the almost-toroidal cavity when the cover is removed and forms an almost-circular groove; and the almost-toroidal cavity is closed, except for the at least one axial indentation, when the cover is fixed. A vehicle including such a support and a method for installing a cable bundle are also provided.

12 Claims, 4 Drawing Sheets

(56) References Cited

U.S. PATENT DOCUMENTS

| | | |
|---|---|---|
| 6,966,791 B1 | 11/2005 | Farr |
| 2014/0367163 A1* | 12/2014 | Islam .................... B65H 75/18 |
| | | 174/70 R |
| 2018/0050646 A1* | 2/2018 | Chapman ............ B60R 16/0215 |
| 2019/0157813 A1* | 5/2019 | Cupples ............. H01R 13/6582 |
| 2019/0285820 A1* | 9/2019 | Brown .................... H04Q 1/09 |

* cited by examiner

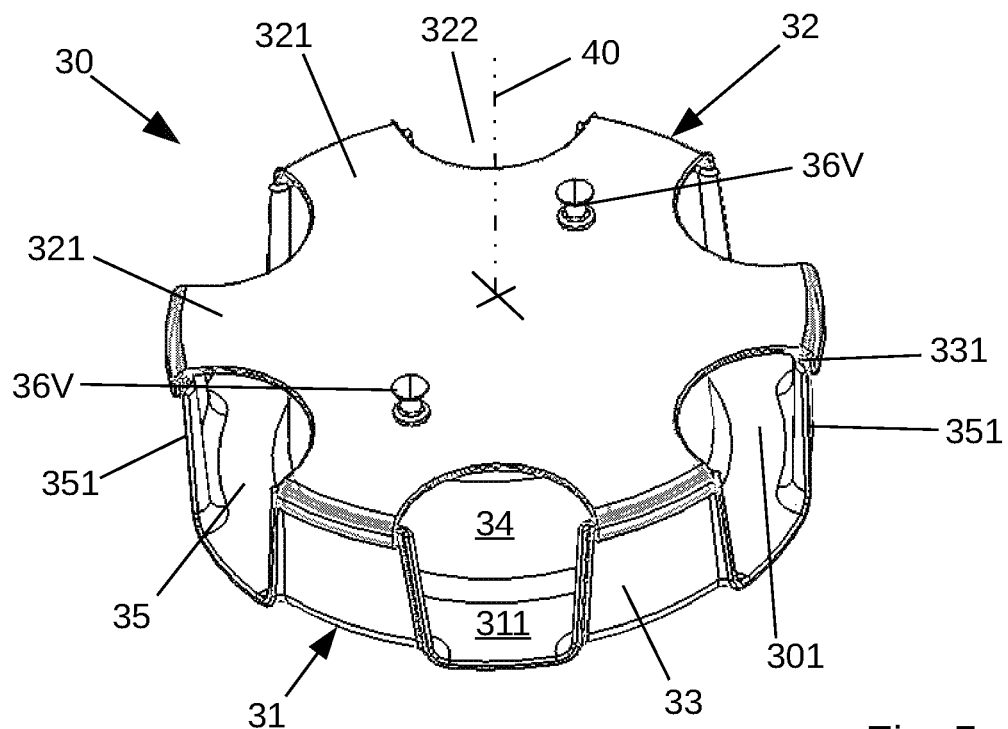
Fig. 5a
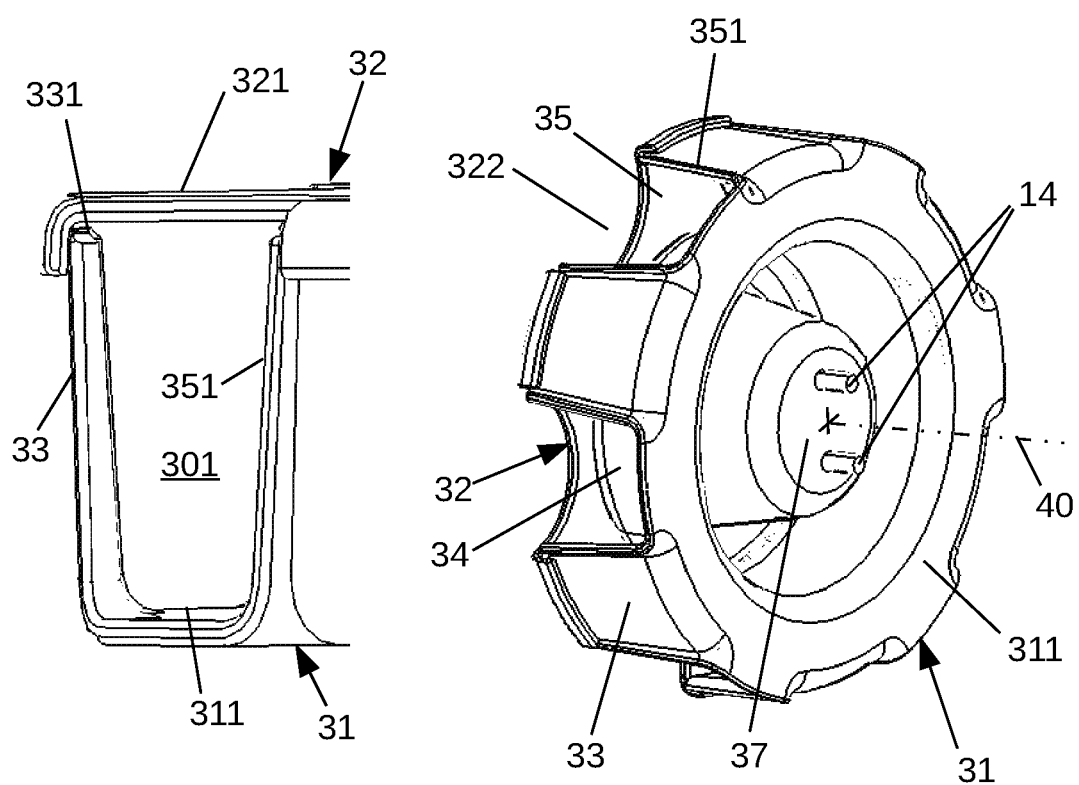
Fig. 5c
Fig. 5b

SUPPORT FOR BUNDLE OVERLENGTHS IN AN ELECTRICAL AND/OR OPTICAL HARNESS, VEHICLE COMPRISING SUCH A SUPPORT AND METHOD FOR INSTALLING BUNDLES BY IMPLEMENTING SUCH A SUPPORT

CROSS REFERENCE TO RELATED APPLICATIONS

This application claims priority to and the benefit of French Application No. 1856339, filed 10 Jul. 2018, the disclosure of which is incorporated herein by reference in its entirety.

BACKGROUND

1. Field

The present disclosure relates to the field of electrical or optical cable installations.

More specifically, the present disclosure is adapted to maintaining electrical or optical cables of harnesses in vehicles, in particular aircraft.

More specifically, the present disclosure provides a solution to the problem of managing overlengths of cables and the dispersions thereof.

2. Brief Description of Related Developments

It is well known in low- or average-power installations comprising electrical wires for the transport of electrical power or for the transport of signals, and today also in installations comprising optical fibres, producing harnesses grouping together wires in bundles connecting different points of the installation and fixing these bundles to the structures of the building or of the vehicle to which the installation is intended.

The case of vehicles is distinguished due to a vibratory environment and other stress sources which urge the cables of the bundles.

Thus, to avoid movements of cables and friction between cables of a harness or against structures, it is generally arranged in a suitable number of supports to which the cables individually or preassembled in the harness are firmly fixed.

In the aeronautic field in particular, due to a severe vibratory environment and risks that could generate damage to cables, strict rules are applied in the fixing of the cables.

It is in particular recommended in the rules of the art to not exceed a maximum cable length between two supports to guarantee the mechanical stability and the lifespan of the cable.

FIG. 1 represents a typical arrangement of a zone wherein is located an end portion of a harness 20, here comprising two bundles 21.

Each bundle 21 is ended by a connector 22 wherein each cable, not represented individually in the representation of the bundles in the drawings, of the bundle is connected to a contact, which cannot be seen in the drawing, of the connector intended to be connected to an item of equipment, not represented, before being fixed, in this example, on the deck 12.

As can be seen in the figure, each bundle is fixed to the structure 10 by way of collars 11 fixed directly on said structure or maintained by collar supports 111.

In this conventional installation example, the structure 10 is a secondary structure, for example a structure of a passenger seat, being fixed onto a main structure, for example, the structure of a fuselage floor 13 of an aircraft, and the bundles before being connected to the equipment rising by a feedthrough 131 of the floor.

To make it possible to connect the bundles 21, a sufficient length of the bundles between the feedthrough 13 and the connectors 22 is of course available.

It will be noted in FIG. 1, that this length makes it possible for each bundle to describe a loop. This loop corresponds to an overlength which makes it possible to facilitate the installation of the bundle for which it is not admissible that the conductors apply traction to the connector when it is connected on the equipment, and this loop makes it possible to fix the overlength of the bundle by making the bundle 21 describe a path along said loop.

A disadvantage of this mounting type is inherent to the dispersion of the overlengths in a complex harness, as is the case in the aircraft.

Indeed, for reasons of optimising production methods, the harnesses are generally produced separately on the workbenches or structures from theoretical data of the lengths of each of the cables, and the harnesses thus produced, with the connectors connected to the cables and tested, are placed in the cell of the aircraft and fixed to the structure of this cell by following predefined pathways.

This integration of the harnesses in the cell does not make it possible, despite the use of markers placed on the harness, to guarantee an absolute reproducibility of the position of the harness and it is also provided to describe a more or less ample loop following the overlength is more or less large due to the production and mounting dispersions of the harness.

In certain cases, when the tolerances are stacked unfavourably, the overlength at the level of the feedthrough 13 is such that the collars provided on the structure 10 no longer make it possible to respect the maximum bundle length stress between two collars. It is thus necessary to modify the installation by adding a collar support and a collar to respect the mounting rule.

Such a solution, which proves to be acceptable at a stage where it is not considered to affect the mounting of the harness on the aircraft, remains disadvantageous industrially.

SUMMARY

The present disclosure provides a solution to the problem of the management of the overlengths by means of a support adapted to the maintaining of a length of one or more bundles which could be different from one installation to another.

For this, an electrical and/or optical cable bundle overlength support comprises a rear wall by which the support is fixed to a structure when it is implemented.

The support of the present disclosure further comprises an almost-toroidal cavity, centred on an axis of the support, perpendicular to an average plane of the rear wall, and the almost-toroidal cavity is delimited by:
  all or some of the rear wall;
  an inner wall laterally delimiting the almost-toroidal cavity on the side of the axis of the support and determining a small diameter D1 of the almost-toroidal cavity;
  an outer wall laterally delimiting the almost-toroidal cavity on the side opposite the axis of the support and determining a large diameter D2, greater than the small diameter D1, of the almost-toroidal cavity; the outer wall comprising at least one axial indentation;
a cover, located opposite the rear wall on the front side of the support;
the cover being fixed removably, such that:
the almost-toroidal cavity is open, on the front side of the support, over the whole length of the almost-toroidal cavity when the cover is removed and forms a closed groove on itself;
the almost-toroidal cavity is closed, except for the at least one axial indentation, when the cover is fixed.

A support which could maintain bundle overlengths greater than those which are permitted between two conventional supports is thus obtained, and this for a determined range of overlengths, without requiring adaptation of supports in a number nor in a placement on the structure.

Furthermore, the support of the present disclosure comprises all or some of the following characteristics insofar as they are technically operable in combination.

The at least one axial indentation has a height along an axial direction of the support substantially equal to a height of the outer wall and has a width according to a perimeter of the outer wall substantially equal to a radial width of the toroidal cavity, substantially equal to the difference between the large diameter D2 and the small diameter D1 of the almost-toroidal cavity.

The outer wall comprises a plurality of axial indentations equally determining side openings of the almost-toroidal cavity.

The outer wall comprises between two and six axial indentations distributed according to a perimeter of the outer wall.

The cover comprises one or more radial indentations arranged opposite the axial indentation(s) to form extended openings of the almost-toroidal cavity.

A radial cross-section of the almost-toroidal cavity is substantially rectangular or square.

A base comprises, assembled together, the rear wall, the inner wall and the outer wall.

The base is formed integrally, produced by one of the moulding, forming, machining, additive manufacturing methods.

Means for fixing the cover maintain the cover attached to the base when the cover is removed.

The small diameter D1 of the almost-toroidal cavity is determined according to a minimum length of an overlength of a bundle to maintain by means of the support.

A difference between the small diameter D1 and the large diameter D2 of the almost-toroidal cavity is determined according to a difference DSL between a minimum length L min and a maximum length L max of an overlength of a bundle to maintain by means of the support.

The cover comprises one or more deformable compression elements, arranged to exert a pressure on the bundle(s) inserted in the almost-toroidal cavity when the cover is fixed.

The present disclosure also relates to a vehicle, comprising an electrical and/or optical installation, and comprising at least one support of the present disclosure, wherein at least one electrical and/or optical cable bundle travels through all or some of the almost-toroidal cavity.

In an embodiment of the vehicle, the at least one bundle enters into the almost-toroidal cavity by a first opening of the outer wall along a direction substantially tangent to the outer wall, substantially travels once through the almost-toroidal cavity and emerges through this first opening or through another opening in the vicinity of this first opening along a direction substantially tangent to the outer wall.

The present disclosure also relates to a method for installing an electrical and/or optical cable bundle implementing at least one support of the present disclosure and comprising steps of:
if the cover is fixed, removing said cover to open the almost-toroidal cavity;
engaging, through the front side of the support, the bundle in a first axial indentation of the outer wall;
forming, with the bundle, a loop travelling through the toroidal cavity over substantially one rotation and exiting the bundle through the first axial indentation or through an axial indentation in the vicinity of this first axial indentation;
as needed, adjusting the position of the loop formed by the bundle between the inner wall and the outer wall to absorb the overlength of the bundle;
fixing the cover to close the almost-toroidal cavity, wherein is maintained the overlength of the bundle.

BRIEF DESCRIPTION OF THE FIGURES

The present disclosure is described in reference to the figures, given as a non-limiting example of an embodiment of the present disclosure, which schematically represents:

FIGS. 5a, 5b, 5c: the support of the present disclosure according to the embodiment of FIG. 4, represented the cover and the base assembled: in isometric top view, FIG. 5a, in rear isometric view, FIG. 5b, and in partial profile view, FIG. 5c;

In the different figures, the drawings are not necessarily represented with one same scale.

DETAILED DESCRIPTION

Figure 1:
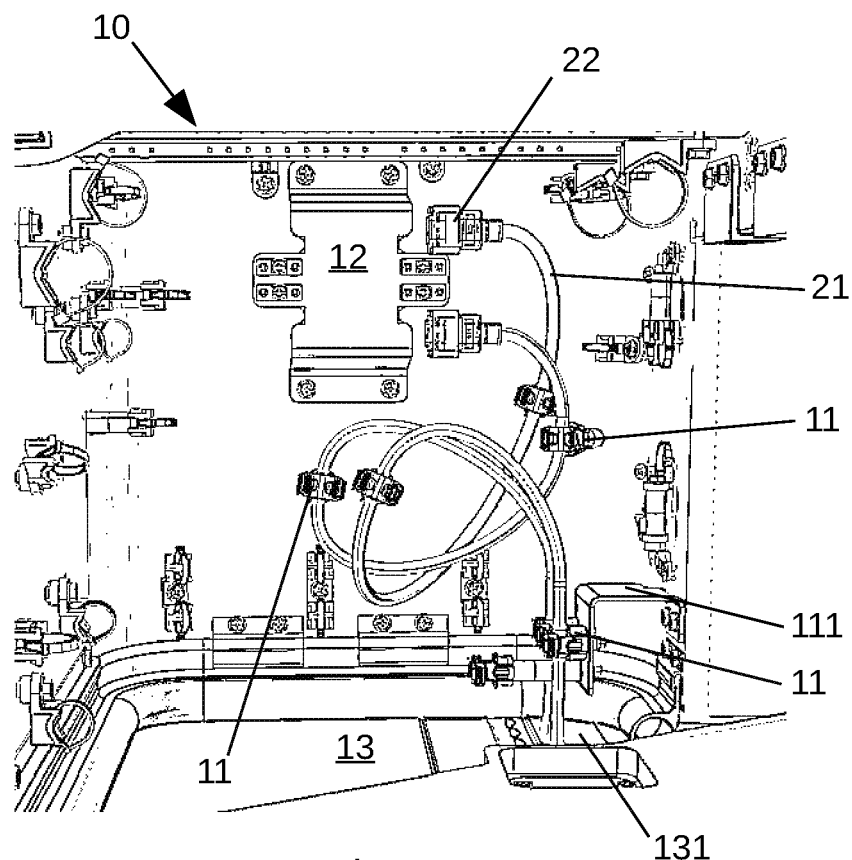
FIG. 1: already cited, an end installation example of a harness according to the prior art comprising collars to maintain bundles fixed to a structure.
Figure 2:
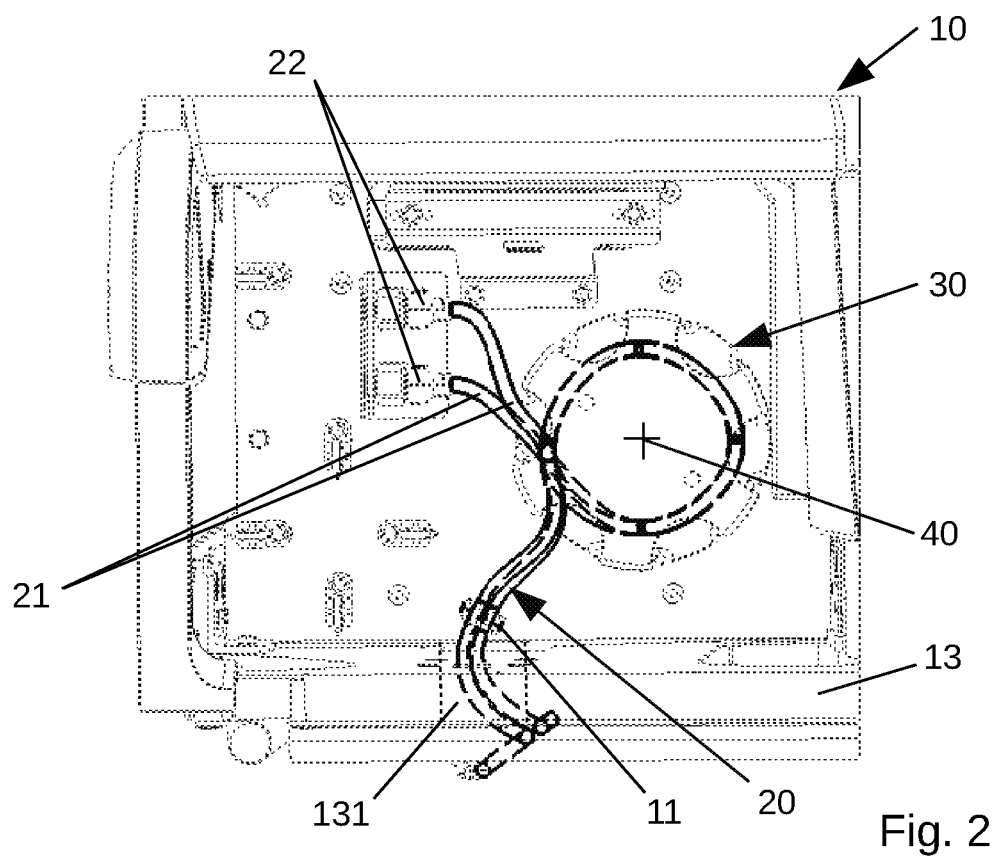
FIG. 2: a schematic view of an end installation example of a harness, under conditions similar to those of FIG. 1, and illustrating the path followed by the overlengths of the bundles maintained by a support of the present disclosure.

FIG. 2 illustrates an implementation example of a support 30, in environmental conditions similar to the case illustrated of the prior art in FIG. 1.

In the detailed description, the support is produced, at least in the embodiments illustrated, with thin walls facing other dimensions of the support. By simplification and to simplify the description, the different walls will be, if necessary, combined with surfaces that they define and the consequent effects with physical thicknesses of the wall are disregarded, a person skilled in the art having general knowledge to consider, if needed, the real thicknesses.

The support 30 is fixed to a structure 10 with respect to which one or more cable bundle(s) 21, in particular electrical and/or optical cables, must be fixed.

It must be understood here, that these are sufficiently flexible or not very rigid bundles to be curved by hand by a mounting operator to adjust the position of it or the front pathway to connect them to an item of equipment or other connecting deck. Typically, these types of conditions are found in electrical or optical installations of aircraft.

The support 30 is furthermore fixed to intercept a path followed by the bundles 21 between a structural feedthrough 131 and the placement of connectors, for example, an item of equipment not represented, to which connectors 22 of said bundles must be connected.

As is represented schematically in FIG. 2, the support 30, of which the shape and other characteristics are subsequently detailed, presents as a top view, a circular assembly shape, and the bundles follow a path, also substantially circular, in said support.

For practical reasons, a rear side of the support 30 will be considered arbitrarily as being the side located against the structure 10 when said support is fixed to said structure, and a front side of the support as being the side opposite the front side, i.e. the visible side when the support is fixed to the structure.

The expressions "towards the rear" and "towards the front" will therefore be interpreted according to this definition of the rear and front sides respectively.

The expressions "towards the inside" and "towards the outside" will have, except for evidence on the contrary, opposite the support, the common direction corresponding to an approximation, reciprocally of a distance, of an axis 40 of the support passing through said support from the rear face towards the front face.

Figure 3:
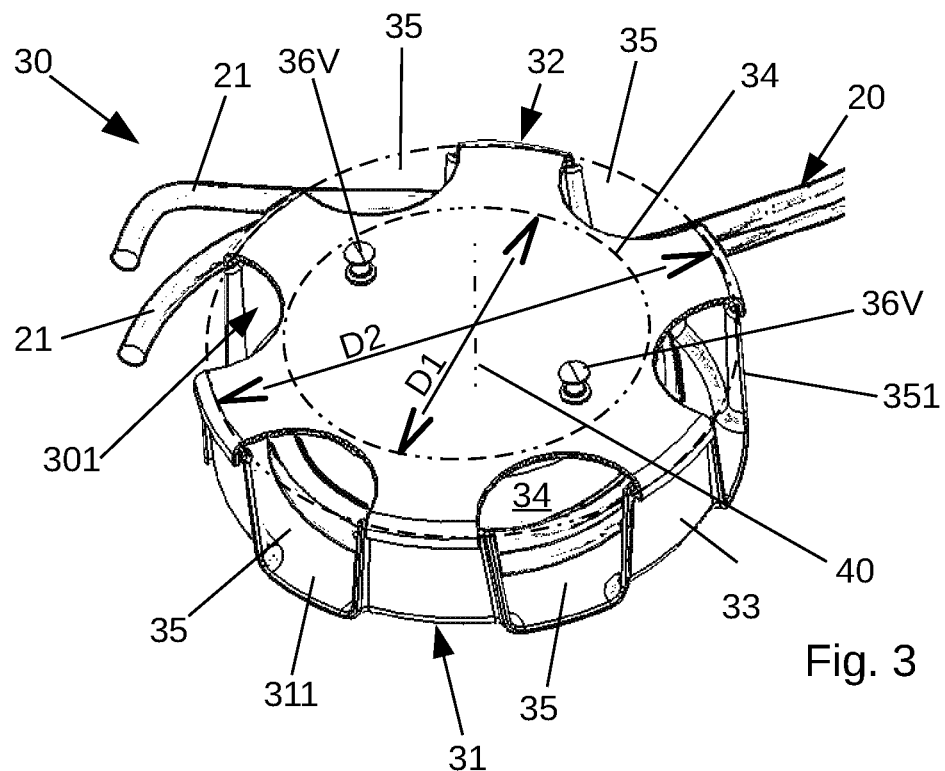
FIG. 3: a schematic view illustrating the principle of the support of the present disclosure ensuring the maintaining of a harness.

FIG. 3 schematically represents a support 30 passed through by two bundles 21. This example of two bundles is not limiting, any number of bundles could be maintained in the support insofar as a total cross-section of the bundles are compatible with the dimensions of the support implemented.

The support 30 comprises a base 31 and a cover 32.

The base 31 and the cover 32 assembled, as represented in FIG. 3, determine a substantially circular, almost-toroidal cavity 301 centred on the axis 40.

The notion or toroidal or almost-toroidal cavity here is to be considered in a general acceptance permitted of a tube closed on itself of which a cross-section in an axial plane of the toroid is not necessarily a circle, and of which the centre of said cross-section does not necessarily describe a circle in the mathematical sense of the term. In particular, the cross-section of the tube can be square, rectangular, trapezoidal. Advantageously, the centre of the cross-section describes a circle but can have a different shape without modifying the principles of the present disclosure.

Now, FIGS. 5a to 5c and FIG. 6 are referred to, of an embodiment of the support.

The base 31 comprises a rear wall 311 by which the support bears on the structure 10 or on an intermediate structure 15 itself fixed to said structure.

The base 31 is, as a top view, substantially circular, of which a centre corresponds to the axis 40 and comprises an outer wall 33 and an inner wall 34 being projected from the rear wall 311 towards the front of the support.

Advantageously, the inner and outer walls are substantially perpendicular to the rear wall as in the examples illustrated.

The cover 32, also substantially circular in a top view, covers the base 31 on the front side of the support 30, on which base said cover bears on a front edge of the outer wall 33 and/or on a front edge of the inner wall 34.

Advantageously, a peripheral edge of the cover is shaped, for example with an edge flange, such that said cover is interlocked with a free edge 331 of the outer wall 33 so as to guarantee a stable position sought of said cover on the base.

In a non-illustrated embodiment, the peripheral edge of the cover is shaped to be clicked with the free edge of the outer wall 33 of the base, by benefiting from an elasticity of the materials implemented, in order to ensure a maintaining of the cover on the base.

Advantageously, screws 36V ensure the maintaining of the cover on the base to avoid the lid being separated in use under the effect of vibrations.

When the base 31 and the cover 32 are assembled, they delimit the almost-toroidal cavity 301 which is radially limited by the outer wall 33 and the inner wall 34 which are substantially cylindrically generating, substantially parallel to the axis 40 of the support 30.

In the embodiment represented, the inner wall is cylindrical of circular cross-section and determines an inner diameter D1 of the almost-toroidal cavity 301 and the outer wall is cylindrical of circular cross-section, of the same axis as the cylinder corresponding to the inner wall, and determines an outer diameter D2 of said almost-toroidal cavity, D2 being necessarily strictly greater than D1.

By construction, the inner wall 34 therefore determines a smaller perimeter ($\pi \times D1$) of the almost-toroidal cavity and the outer wall 33 determines a greater perimeter ($\pi \times D2$) of said almost-toroidal cavity.

The outer wall 33 also comprises axial indentations 35 forming, when the cover is assembled on the base, openings by which the almost-toroidal cavity 301 communicates with the outer space to the support 30.

The outer wall 33 must comprise at least one axial indentation 35 and advantageously has a plurality of axial indentations distributed over said outer wall and separated angularly so as to form an alternance of closed sectors of the outer wall and open sectors when the perimeter of said outer wall is travelled.

A height of the opening corresponds substantially to a height of the almost-toroidal cavity 301 between the cover 32 and the rear wall 311 of the base, which, in practice, corresponds to axial indentations 35 open substantially over the whole height of the outer wall 33.

A width of the openings must make it possible to pass the bundles 21 for which the support 30 will be used and, in practice, it can be produced from axial indentations 35 of which the width is substantially that of a width of the almost-toroidal cavity 301 along a radial direction between the inner wall 34 and the outer wall 33. Openings having substantially the same dimensions as a cross-section in an axial plane of the almost-toroidal cavity 301 is thus obtained, which ensures the possibility of making these indentations pass through these indentations, the bundle(s) which will be installed in the almost-toroidal cavity.

In the embodiment illustrated in FIGS. 5a to 5c and 6, the cover 32 also comprises radial indentations 322 separated by radial arms 321, said radial indentations being arranged, when the cover is assembled on the base, to correspond to the axial indentations 35 of the outer wall 33. It is thus formed of openings of the almost-toroidal cavity 301 of greater dimensions which make it possible, amongst others, to visually inspect the bundles without removing the cover, even manually move the bundles inside said almost-toroidal cavity during the mounting of the bundle(s).

Advantageously, the rear wall 311 of the base extends to the proximity of the axis 40 of the support 30 so as to form, in a central portion, of said support, a support plane 37 by which the base 31 is fixed to the structure 10 or an intermediate support 15. The support plane can be fixed by any suitable means to the environment, wherein it will be placed, for example, by gluing, by riveting, by screwing with screws 14, this list not being exhaustive.

Advantageously, the edges 351 of the axial indentations 35, and generally all the edges on which the bundles 21 are likely to rub, are produced with softened shapes, in order to avoid damaging the protective sheaths for these bundles and cables which form them.

The advantages of the present disclosure will be best understood in the description of the implementation of the support 30.

Figure 4:
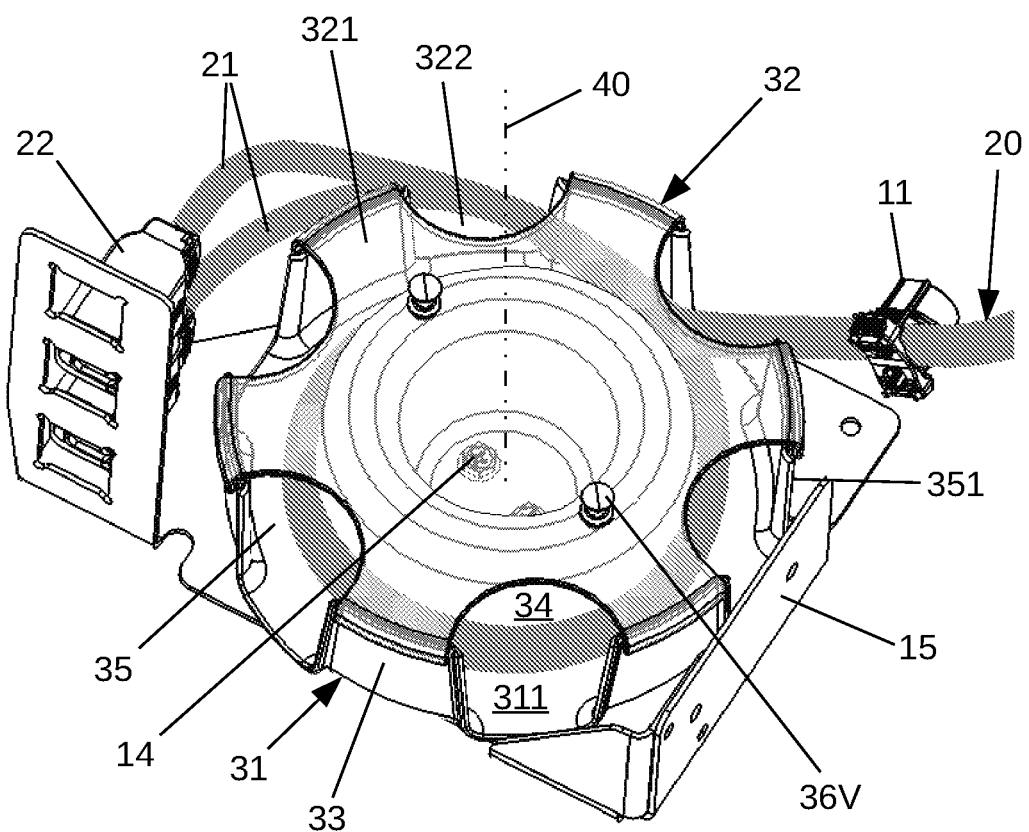
FIG. 4: a schematic view of an embodiment example of the support of the present disclosure represented in a functional position fixed on a deck, the arrangement inside the support and the cables being visible through the cover of the support represented partially transparent.
Figure 6:
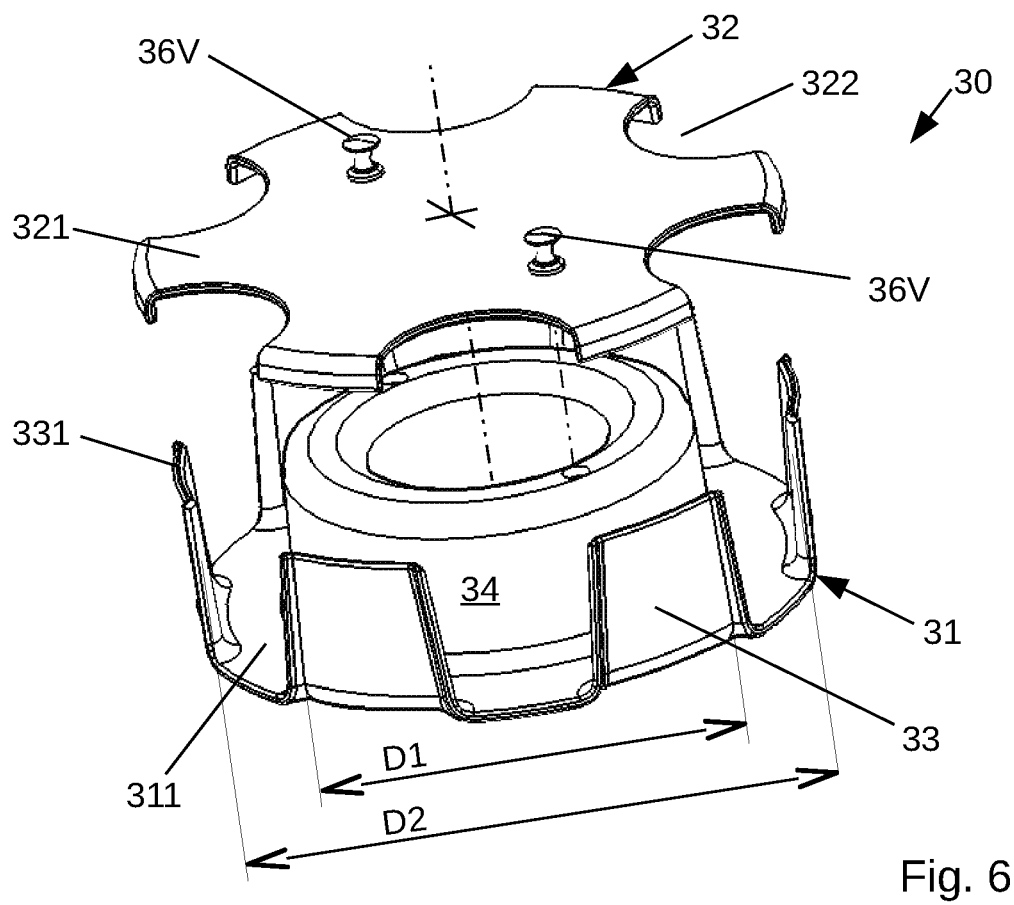
FIG. 6: the support of the FIGS. 4, 5a, 5b and 5c according to the isometric view of FIG. 5a but exploded, the cover being represented separated from the base.

Reference is made here mainly to FIG. 2, to FIG. 3 and to FIG. 4.

Considering FIG. 2, one or more of the bundles 21 provided with connectors 22 of a harness 20 of a vehicle, for example, an aircraft, are awaiting to be connected to an item of equipment comprising connectors, not represented, complementary to the connectors 22 of the harness.

The bundle(s) have, at this stage, a free available length, which has an overlength SL with respect to a minimum length strictly necessary for the connection of the equipment.

When the equipment is implemented in the vehicle, said equipment comprises a support 30 of the present disclosure fixed to the structure 10 of said equipment to an appropriate placement over a path provided to be followed by the bundle(s) 21. This placement of the support 30 on the structure 10 is determined in the design of said structure according to the environment wherein the structure will be mounted.

In a first step, the cover 32 is removed from the base such that the almost-toroidal cavity 301 is open with no upper wall to form a groove, and such that the axial indentations 35 are also unobstructed.

In a second step, each bundle 21 is placed in the groove wherein it travels substantially a rotation forming a loop by being engaged by one of the indentations 35 and unobstructed by the same indentation or by an indentation in the vicinity.

In the example illustrated in FIG. 4, each bundle 21 travels a complete rotation in the groove to be unobstructed there by the following indentation, in the rotational direction travelled, of the indentation through which it has been engaged.

This configuration, when the space between the indentations is adapted, makes it possible for the bundle to have substantially one same orientation in the space between the engagement thereof and the clearance thereof of the support 30, hence the interest in placing said support on a "natural" path of the bundle for a conventional installation between two collars or between a last collar and the fixed connector.

Considering a length of the loop formed by the bundle 21 in the groove, said length can be at the maximum of the perimeter of the inner wall 34 and at the maximum of the perimeter of the outer wall 33. Thus, the support 30 is able to maintain in the groove, over substantially one rotation, a length of between L min=$\pi \times D1$ and L max=$\pi \times D2$.

By having considered during the design of the support 30 that L min is at most equal, and preferably substantially equal by lower value, on the condition of minimum value permitted from the overlength SL to maintain to define the diameter D1, the support 30 will be able to maintain an overlength which could exceed a value DSL=$\pi \times (D2-D1)$, the minimum value of said overlength.

Here, it will be noted that the principle is exposed in a simplified manner, but that in practice, it can be necessary to consider an average diameter Df of the bundle to adapt the calculations in this case, the formula above thus becoming DSL=$\pi \times (D2-D1-Df)$.

When the overlength will have the minimum admissible value, the bundle 21 will follow closest to the inner wall 34, and when the overlength will exceed from the value DSL, said minimum overlength, the bundle 21 will follow closest to the outer wall 33. The necessary deformations are here possible due to the limited rigidity of the bundle which will be curved without difficulty by an operator carrying out the mounting of the bundle.

When the bundle(s) will have thus been placed, the cover 32 is put back in place on the base 31 then secured by the holding elements, such that the bundles are found maintained in the almost-toroidal cavity 301, for a range of possible overlengths, without it being necessary to modify the number or the support position of collars.

An optimal arrangement of the support 30 makes it possible, with respect to a conventional installation of replacing at least two collars and in particular avoids being located under conditions where it would be necessary to add a collar not provided.

In an embodiment example of the installation of an item of equipment on an aircraft, it is sought to absorb excesses DSL of the overlength which could reach 15 centimetres, without modifying the arrangement of the supports.

Such a capacity is obtained with a support 30 of the present disclosure, of which the outer diameter D2 is greater by only 5 centimetres, to which the diameter of the bundle to be installed must be added, to the inner diameter D1 (by taking $\pi$=3 and by ignoring the average diameter of the bundle), that is an almost-toroidal cavity of 2.5 centimetres of width, by ignoring the diameter of the bundle.

The minimum overlength is advantageously taken into consideration to calculate the inner diameter D1, advantageously to correspond to a loop of the bundle describing the almost-toroidal cavity by following the inner wall 34 over a rotation. For example, for a minimum overlength of 30 centimetres, an inner diameter D1 of 10 centimetres will be considered (by taking $\pi$=3 and by ignoring the average diameter of the bundle).

Although the circular shape of the groove of the support is initially optimal mathematically, the support of the present disclosure, for example, to be geometrically adapted to a specific environment, can take varied shapes insofar as the function thereof is preserved to maintain at least one bundle forming a loop over around one rotation in an almost-toroidal cavity, wherein this loop is confined, with several possible lengths of the loop due to the width of the almost-toroidal cavity.

In particular, the number of indentations 35 in the outer wall 33 can be different from that represented in the embodiment example described.

At least one indentation must be provided, and advantageously at least two indentations more or less distant, make it possible for a bundle to enter through one of the indentations and emerges through the other as in the diagram of FIG. 3, facilitating the installation of the bundles 21, even using different indentations in functions of supports bundles.

A higher number of indentations, distributed over the perimeter of the outer wall, for example 6 indentations equally distributed as in the embodiments illustrated in the figures, provides a flexibility of installation of the bundle in the support which makes it possible to produce support models which could be used under varied installation conditions.

It is also understood from the description of the implementation of the support that the shapes of the base, of the cover and the means for maintaining said cover on the base are not critical and can be different from the embodiments illustrated without damaging the result sought.

Figure 7:
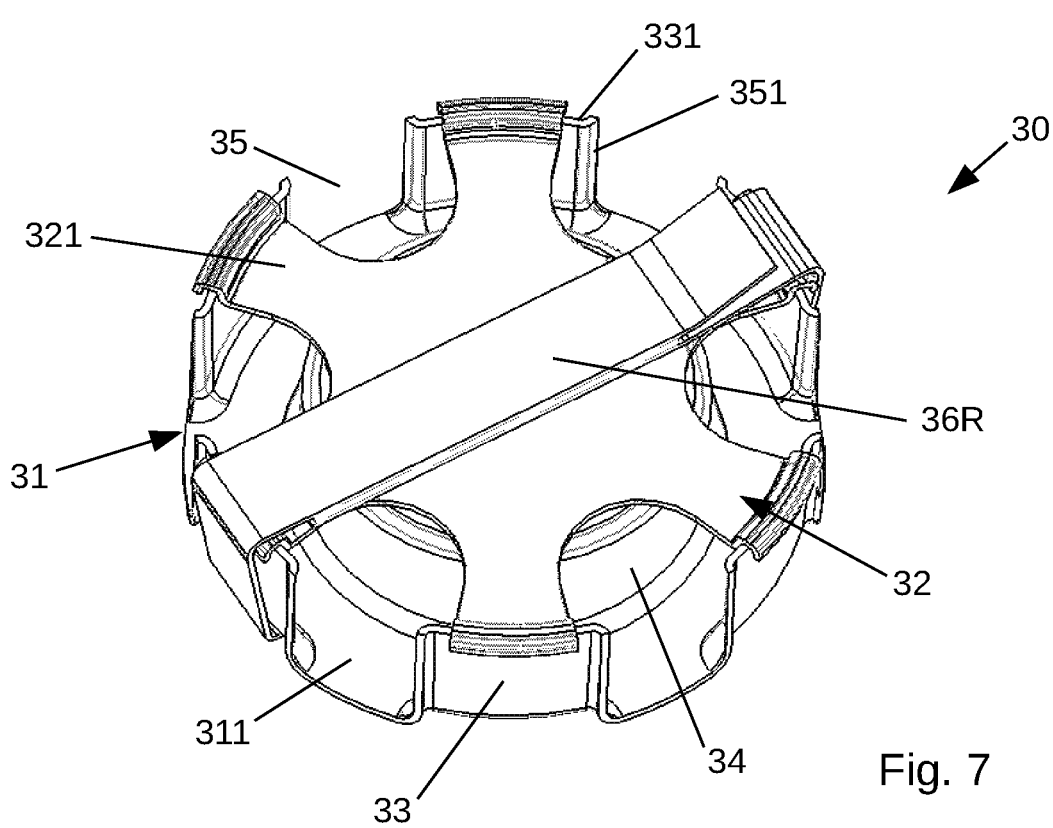
FIG. 7: an embodiment of a support represented in isometric top view having a variant of the device for maintaining the cover on the base.

In the embodiment illustrated in FIG. 7, the cover 32 is maintained on the base 31 by a self-sticking strip 36R fixed to the base and which straps the cover to hold it in position on the base instead of or complementing the screws 36V. In an embodiment, the cover is furthermore fixed to an end of the strip 36R such that the cover cannot be lost by remaining, even unobstructed from the base, attached to said base by the strip.

In practice, any fixing device ensuring the assembly of the cover on the base, under the conditions of use provided of the support 30, can be used, the screws 36V and the strap 36R represented illustrating examples of devices and arrangement to fix the cover.

The cover of the support can also be provided with compression elements, solution not represented, which bears, when the cover is fixed on the base, on the bundles in the almost-toroidal cavity to avoid wear of the cable protections in a vibratory environment.

Advantageously, these compression elements are flexible to be adapted to different cross-sections and different numbers of bundles. For example, these compression elements consist of blocks of a flexible honeycomb foam, glued on a face of the cover rotated towards the inside of the almost-toroidal cavity, which will be able to be deformed with a sufficient amplitude to bear on the bundles.

The support can be made of any suitable material for the environment wherein it must be used.

It can be made exclusively from a metal material, but, except for a demanding environment, it will preferably be made by implementing a polymer resin, charged or not with fibres.

Known machining, forming, moulding or additive manufacturing techniques can be used to produce the portions of the support.

Advantageously, the base is made of one single part.

The dimensions thereof are easily adaptable according to case.

According to the implementation principle, each bundle forms a loop over a rotation by girdling the inner wall, but the path of a bundle in the almost-toroidal cavity can be shortened by emerging through a preceding opening of the outer wall, before having described a complete loop, subject to an adaptation of the overlength, such that the bundle has an exit direction, different from an entry direction. On the contrary, the path of a bundle in the almost-toroidal cavity can be extended by emerging through a following opening of the outer wall, after having described more than a complete loop.

Advantageously, a bundle will travel into the almost-toroidal cavity of the support over a path of between 0.5 rotations and 1.5 rotations to be adapted to a large number of installation configurations during the implementation of the support of the present disclosure.

What is claimed is:

1. A support for bundle overlengths of electrical and/or optical cables, comprising:
a rear wall, by which said support is fixed to a structure when it is implemented, wherein the support further comprises:
an almost-toroidal cavity, centred on an axis of the support perpendicular to an average plane of the rear wall, said almost-toroidal cavity being delimited by:
all or some of the rear wall;
an inner wall laterally delimiting the almost-toroidal cavity on the side of the axis of the support and determining a small diameter D1 of said almost-toroidal cavity; and
an outer wall laterally delimiting the almost-toroidal cavity on the side opposite the axis of the support and determining a large diameter D2, greater than the small diameter D1, of said almost-toroidal cavity; said outer wall comprising at least two axial indentations distributed according to a perimeter of said outer wall; and
a cover, located opposite the rear wall on the front side located opposite the rear wall on the front side of the support, the cover being removably fixed such that:
the almost-toroidal cavity is open, on the front side of the support, over a whole length of said almost-toroidal cavity when the cover is removed and forms a groove closed on itself; and
the almost-toroidal cavity is closed, except for the at least one axial indentation, when the cover is fixed;
wherein the cover comprises two or more radial indentations arranged opposite the two or more axial indentations to form extended openings of the almost-toroidal cavity.

2. The support according to claim 1, where the at least one axial indentation has a height along an axial direction of said support substantially equal to a height of the outer wall and has a width according to a perimeter of the outer wall substantially equal to a radial width of the toroidal cavity, substantially equal to the difference between the large diameter D2 and the small diameter D1 of the almost-toroidal cavity.

3. The support according to claim 1, wherein a radial cross-section of the almost-toroidal cavity is substantially rectangular or square.

4. The support according to claim 1, wherein a base comprises, assembled together, the rear wall, the inner wall and the outer wall.

5. The support according to claim 4, wherein the base is formed integrally, produced by one of the moulding, forming, machining, additive manufacturing methods.

6. The support according to claim 4, wherein the fixing means of the cover maintain said cover attached to the base when the cover is removed.

7. The support according to claim 1, wherein the small diameter D1 of the almost-toroidal cavity is determined according to a minimum length of an overlength of a bundle to be maintained by means of said support.

8. The support according to claim 1, wherein a difference between the small diameter D1 and the large diameter D2 of the almost-toroidal cavity is determined according to a difference DSL between a minimum length Lmin and a maximum length Lmax of an overlength of a bundle to be maintained by means of said support.

9. The support according to claim 1, wherein the cover comprises one or more deformable compression element(s), arranged to exert a pressure on the bundle(s) inserted in the almost-toroidal cavity when said cover is fixed.

10. The vehicle according to claim 9, wherein the at least one bundle enters into the almost-toroidal cavity by a first opening of the outer wall along a direction substantially tangent to said outer wall, substantially travels once through the almost-toroidal cavity and emerges through said first opening or through another opening in the vicinity of said first opening along a direction substantially tangent to the outer wall.

11. A vehicle, comprising an electrical and/or optical installation, and comprising at least one support according to claim 1, wherein at least one support of at least one bundle of electrical and/or optical cables travel through all or some of the almost-toroidal cavity.

12. A method for installing a bundle of electrical and/or optical cables implementing at least one support according to claim 1, the method comprising:
- if the cover is fixed, removing said cover to open the almost-toroidal cavity;
- engaging, through the front side of the support, the bundle in a first axial indentation of the outer wall;
- forming, with the bundle, a loop travelling through the toroidal cavity over substantially one rotation and exiting the bundle through the first axial indentation or through an axial indentation in the vicinity of this first axial indentation;
- as needed, adjusting the position of the loop formed by the bundle between the inner wall and the outer wall to absorb the overlength of the bundle; and
- fixing the cover to close the almost-toroidal cavity, wherein is maintained the overlength of the bundles.

\* \* \* \* \*